United States Patent
Song

(10) Patent No.: US 7,840,096 B2
(45) Date of Patent: Nov. 23, 2010

(54) DIRECTIONAL INTERPOLATION METHOD AND VIDEO ENCODING/DECODING APPARATUS AND METHOD USING THE DIRECTIONAL INTERPOLATION METHOD

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1052 days.

(21) Appl. No.: 11/593,024

(22) Filed: Nov. 6, 2006

(65) Prior Publication Data

US 2007/0172153 A1    Jul. 26, 2007

(30) Foreign Application Priority Data

Jan. 23, 2006    (KR) .................... 10-2006-0006804

(51) Int. Cl.
*G06K 9/36* (2006.01)
*G06K 9/32* (2006.01)
(52) U.S. Cl. .................. 382/300; 382/238; 382/239
(58) Field of Classification Search .............. 382/300, 382/238, 239, 197, 199; 348/441; 358/525
See application file for complete search history.

(56) References Cited

U.S. PATENT DOCUMENTS

| | | | |
|---|---|---|---|
| 5,682,205 A * | 10/1997 | Sezan et al. .............. 348/452 |
| 5,991,463 A * | 11/1999 | Greggain et al. ............ 382/298 |
| 6,831,948 B1 | 12/2004 | Van Dijk et al. | |
| 6,859,494 B2 | 2/2005 | Panusopone et al. | |
| 6,928,196 B1 * | 8/2005 | Bradley et al. .............. 382/300 |
| 7,576,783 B2 * | 8/2009 | Hwang et al. ............ 348/222.1 |
| 7,653,133 B2 * | 1/2010 | Woods et al. .......... 375/240.13 |
| 2005/0041842 A1 * | 2/2005 | Frakes et al. ................ 382/128 |
| 2005/0169557 A1 * | 8/2005 | Xavier ........................ 382/300 |

FOREIGN PATENT DOCUMENTS

| | | |
|---|---|---|
| JP | 2004-153668 A | 5/2004 |
| KR | 10-2004-0036455 A | 4/2004 |
| WO | WO 00/65829 A1 | 11/2000 |
| WO | WO 01/41451 A1 | 6/2001 |

\* cited by examiner

*Primary Examiner*—Yon Couso
(74) *Attorney, Agent, or Firm*—Sughrue Mion, PLLC

(57) ABSTRACT

A directional interpolation method and a video encoding/decoding apparatus and method using the directional interpolation method. The directional interpolation method includes selecting one of a plurality of directional interpolation modes for a predetermined-size block based on the characteristics of input image data, performing directional interpolation on the predetermined-size block based on the selected directional interpolation mode, and generating mode information indicating the selected directional interpolation mode.

34 Claims, 13 Drawing Sheets

FIG. 6D $A_{int\_45} = (p_{13} + p_{14} + p_{22} + p_{23})/4$

FIG. 6E $A_{int\_135} = (p_{12} + p_{13} + p_{23} + p_{24})/4$ $C_{int\_0} = (p_{12} + p_{13} + p_{22} + p_{23})/4$ $C_{int\_135} = (p_{12} + p_{23})/2$ $C_{int\_45} = (p_{13} + p_{22})/2$

DIRECTIONAL INTERPOLATION METHOD AND VIDEO ENCODING/DECODING APPARATUS AND METHOD USING THE DIRECTIONAL INTERPOLATION METHOD

CROSS-REFERENCE TO RELATED PATENT APPLICATION

This application claims priority from Korean Patent Application No. 10-2006-0006804, filed on Jan. 23, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to motion compensation, and more particularly, to a video encoding/decoding using directional interpolation for improving motion compensation accuracy.

2. Description of the Related Art

According to the moving picture experts group (MPEG)-1, MPEG-2, MPEG-4, and H.264 encoding standards, P-picture encoding, in which the current picture is encoded by referring to a previous picture, and B-picture encoding, in which the current picture is encoded by referring to both a previous picture and a future picture, are adopted, and motion compensation is performed based on P-picture encoding and B-picture encoding. In particular, according to the MPEG-4 or H.264 encoding standard, motion compensation is performed in units of a macroblock or on each of a plurality of blocks obtained by dividing a macroblock. Motion compensation is performed after interpolation for obtaining half pixels, quarter pixels, or one eighth pixels is performed on a block composed of integer pixels to improve the accuracy of data.

FIG. 1 is a reference diagram for explaining half-pixel interpolation.

Referring to FIG. 1, gray boxes indicate original pixels and white boxes indicate interpolation pixels. The original pixels mean integer pixels. In FIG. 1, the interpolation pixels 5, 6, 7, 8, and 9 indicate half pixels. Each of the half pixels is obtained based on its vertically or horizontally adjacent integer pixels or half pixels. For example, the half pixel 5 is obtained based on the integer pixels 1 and 2 and the half pixel 8 is obtained based on the integer pixels 3 and 4. The half pixel 6 is obtained based on the integer pixels 1 and 3 and the half pixel 7 is obtained based on the integer pixels 2 and 4. The half pixel 9 is obtained based on the half pixels 5 and 8 or the half pixels 6 and 7. Although the number of integer pixels is limited to 4 for convenience of explanation, the number of pixels used in interpolation may be adjusted properly. For example, the half pixel 5 may be obtained based on not only the integer pixels 1 and 2 but also its horizontally adjacent integer pixels. The interpolation pixels are indicated by integers within the same range as the original pixels. For example, if the original pixels are indicated by integers within a range of 0-255, the interpolation pixels also are indicated by integers within a range of 0-255.

FIG. 2 is a reference diagram for explaining interpolation used for quarter pixel interpolation of luminance components in H.264, in which some pixels of a predetermined motion compensation block are illustrated. In FIG. 2, gray boxes indicate integer pixels and white boxes indicate interpolation pixels.

In interpolation of FIG. 2, a plurality of pixels, i.e., 6 pixels, are used to obtain a single interpolation pixel. In addition, each of the pixels used in interpolation is given a weight. To this end, a 6-tap filter is used. The 6-tap filter has 6 tap values. The tap values mean weights given to the pixels used in interpolation. For example, tap values (1, −5, 20, 20, −5, 1) may be used. Various numbers of pixels may be used in interpolation and various weights, i.e., tap values, may be given thereto.

<Half Pixel b>

To obtain the half pixel b, 6 integer pixels E, F, G, H, I, and J that are horizontally adjacent to the half pixel b are used. If the foregoing 6-tap filter is applied to the integer pixels E, F, G, H, I, and J, a horizontal sum b1 is obtained as follows:

$$b1 = (E - 5*F + 20*G + 20*H - 5*I + J) \quad (1)$$

Next, 16 is added to the horizontal sum b1, the result of the addition is divided by 32, the result of the division is made an integer, and range adjustment is performed on the integer, thereby finally obtaining the half pixel b, as follows:

$$b = \text{Clip1}Y((b1+16) \gg 5) \quad (2),$$

where the result of addition, i.e., b1+16, is made an integer by rounding off. [$\gg 5$] indicates dividing the result of the addition by 32 ($=2^5$) and then rounding off the result of the division to the nearest integer. This is because, since the sum of the tap values of the 6-tap filter is 32 (i.e., 32 pixel values are added), the average can be obtained by dividing the result of the addition by 32. Clip1Y( ) maps the obtained integer, i.e., (b1+16)$\gg$5, to one within a range of integers indicating the original pixels (integer pixels). For example, when integer pixels are indicated by integers within a range of 0-255, if the obtained integer falls outside this range, Clip1Y( ) maps the obtained integer to a predetermined value within the range.

<Half Pixel h>

To obtain the half pixel h, 6 integer pixels A, C, G, M, R, and T that are vertically adjacent to the half pixel h are used. If the foregoing 6-tap filter is applied to the integer pixels A, C, G, M, R, and T, a vertical sum h1 is obtained as follows:

$$h1 = (A - 5*C + 20*G + 20*M - 5*R + T) \quad (3)$$

Next, 16 is added to the vertical sum h1, the result of the addition is divided by 32, an average is obtained by rounding off the result of division, and range adjustment is performed on the average, thereby finally obtaining the half pixel h, as follows:

$$h = \text{Clip1}Y((h1+16) \gg 5) \quad (4)$$

<Half Pixel j>

The half pixel j can be obtained in a similar manner as the half pixel h. In other words, the half pixel j is obtained as follows:

$$j1 = (cc - 5*dd + 20*h1 + 20*m1 - 5*ee + ff) \text{ or}$$

$$j1 = (aa - 5*bb + 20*b1 + 20*s1 - 5*gg + hh) \quad (5)$$

$$j = \text{Clip1}Y((1+512) \gg 10) \quad (6)$$

<Quarter Pixel a>

To obtain the quarter pixel a, a horizontal average filter of half pixels and half pixels that are adjacent to the quarter pixel a is used. For example, the quarter pixel a is obtained as follows:

$$a = (G + b + 1) \gg 1 \quad (7),$$

where $(G+b+1) \gg 1$ indicates adding 1 to (G+b), dividing the result of the addition by 2, and making the result of division an integer by rounding off the result of division to the nearest integer. The remaining quarter pixels c, d, n, f, j, k, and q also are obtained as follows:

$$c=(H+b+1)\gg1 \quad (8)$$

$$d=(G+h+1)\gg1 \quad (9)$$

$$n=(M+h+1)\gg1 \quad (10)$$

$$f=(b+j+1)\gg1 \quad (11)$$

$$i=(h+j+1)\gg1 \quad (12)$$

$$k=(j+m+1)\gg1 \quad (13)$$

$$k=(j+s+1)\gg1 \quad (14)$$

FIG. 3 is a view for explaining interpolation of chrominance components in H.264. In interpolation according to H.264, luminance components and chrominance components are processed in different manners. The predictive interpolation value of a chrominance signal is obtained by performing linear interpolation on integer pixels with ⅛-pixel accuracy. The motion vector of a chrominance frame is ½ the magnitude of that of a luminance frame. Once the motion vector is determined, a predictive interpolation value v is determined as follows:

$$v=((8-dx)(8-dy)*A+dx(8-dy)*B+(8-dx)*dy*C+ dx*dy*D+32)\gg6 \quad (15),$$

where dx and dy are values indicating the motion vector of the chrominance frame.

As can be appreciated from FIGS. 2 and 3, related art sub-pixel interpolation is performed only horizontally or vertically without considering the characteristics of a video, resulting in degradation of the accuracy of interpolation and motion compensation using the interpolation.

SUMMARY OF THE INVENTION

The present invention provides an interpolation method having high accuracy and a video encoding/decoding apparatus using the interpolation method.

According to one aspect of the present invention, there is provided a directional interpolation method including selecting one of a plurality of directional interpolation modes for a predetermined-size block based on characteristics of input video data, performing directional interpolation on the predetermined-size block based on the selected directional interpolation mode, and generating mode information indicating the selected directional interpolation mode.

The characteristics of the input image data indicate edge information and the selection of the directional interpolation mode further comprises calculating a gradient for each of a plurality of directions with respect to each of respective pixels included in the predetermined-size block.

The selection of the directional interpolation mode may be performed by selecting a direction having a smallest gradient and selecting a directional interpolation mode corresponding to the selected direction.

According to another aspect of the present invention, there is provided a directional interpolation method including selecting one of a plurality of directional interpolation modes for each pixel based on characteristics of input video data and performing directional interpolation on the pixel based on the selected directional interpolation mode.

According to still another aspect of the present invention, there is provided a directional interpolation method including extracting mode information from a received bitstream, in which the mode information indicates a directional interpolation mode that is selected among a plurality of directional interpolation modes based on characteristics of input video data, and performing directional interpolation on a predetermined-size block based on the extracted mode information.

According to yet another aspect of the present invention, there is provided a motion compensation method using a directional interpolation method. The directional interpolation method includes selecting one of a plurality of directional interpolation modes for a predetermined-size block based on characteristics of input video data, performing directional interpolation on the predetermined-size block based on the selected directional interpolation mode, and generating mode information indicating the selected directional interpolation mode.

According to yet another aspect of the present invention, there is provided a motion compensation method using a directional interpolation method. The directional interpolation method includes selecting one of a plurality of directional interpolation modes for each pixel based on characteristics of input video data and performing directional interpolation on the pixel based on the selected directional interpolation mode.

According to yet another aspect of the present invention, there is provided a motion compensation method using a directional interpolation method. The directional interpolation method includes extracting mode information from a received bitstream, in which the mode information indicates a directional interpolation mode that is selected among a plurality of directional interpolation modes based on characteristics of input video data, and performing directional interpolation on a predetermined-size block based on the extracted mode information.

According to yet another aspect of the present invention, there is provided a video encoding method using a motion compensation method applying a directional interpolation method. The directional interpolation method includes selecting one of a plurality of directional interpolation modes for each of a plurality of predetermined-size blocks based on characteristics of input video data, performing directional interpolation on the predetermined-size blocks based on the selected directional interpolation mode, and generating mode information indicating the selected directional interpolation mode.

According to yet another aspect of the present invention, there is provided a video encoding method using a motion compensation method applying a directional interpolation method. The directional interpolation method includes selecting one of a plurality of directional interpolation modes for each pixel based on characteristics of input video data and performing directional interpolation on the pixel based on the selected directional interpolation mode.

According to yet another aspect of the present invention, there is provided a video decoding method using a motion compensation method applying a directional interpolation method. The directional interpolation method includes extracting mode information from a received bitstream, in which the mode information indicates a directional interpolation mode that is selected among a plurality of directional interpolation modes based on characteristics of input video data, and performing directional interpolation on a predetermined-size block based on the extracted mode information.

According to yet another aspect of the present invention, there is provided a directional interpolation apparatus including a directional interpolation mode selection unit, a directional interpolation unit, and a mode information generation unit. The directional interpolation mode selection unit selects one of a plurality of directional interpolation modes for a predetermined-size block based on characteristics of input video data. The directional interpolation unit performs directional interpolation on the predetermined-size block based on the selected directional interpolation mode. The mode information generation unit generates mode information indicating the selected directional interpolation mode.

According to yet another aspect of the present invention, there is provided a directional interpolation apparatus including a directional interpolation mode selection unit and a directional interpolation unit. The directional interpolation mode selection unit selects one of a plurality of directional interpolation modes for each of a plurality of pixels based on characteristics of input video data. The directional interpolation unit performs directional interpolation on the pixels based on the selected directional interpolation mode.

According to yet another aspect of the present invention, there is provided a directional interpolation apparatus including a mode information extraction unit and a directional interpolation unit. The mode information extraction unit extracts mode information from a received bitstream, in which the mode information indicates a directional interpolation mode that is selected among a plurality of directional interpolation modes based on characteristics of input video data. The directional interpolation unit performs directional interpolation on a predetermined-size block based on the extracted mode information.

According to yet another aspect of the present invention, there is provided a computer-readable recording medium having recorded thereon a program for a directional interpolation method. The directional interpolation method includes selecting one of a plurality of directional interpolation modes for each of a plurality of predetermined-size blocks based on characteristics of input video data, performing directional interpolation on the predetermined-size blocks based on the selected directional interpolation mode, and generating mode information indicating the selected directional interpolation mode.

According to yet another aspect of the present invention, there is provided a computer-readable recording medium having recorded thereon a program for a directional interpolation method. The directional interpolation method includes selecting one of a plurality of directional interpolation modes for each pixel based on characteristics of input video data and performing directional interpolation on the pixel based on the selected directional interpolation mode.

According to yet another aspect of the present invention, there is provided a computer-readable recording medium having recorded thereon a program for a directional interpolation method. The directional interpolation method includes extracting mode information from a received bitstream, in which the mode information indicates a directional interpolation mode that is selected among a plurality of directional interpolation modes based on characteristics of input video data, and performing directional interpolation on a predetermined-size block based on the extracted mode information.

BRIEF DESCRIPTION OF THE DRAWINGS

The above and other aspects of the present invention will become more apparent by describing in detail exemplary embodiments thereof with reference to the attached drawings, in which:

FIGS. 6A through 6E are views for explaining interpolation with respect to a pixel A among pixels illustrated in FIG. 5 according to an exemplary embodiment of the present invention;

DETAILED DESCRIPTION OF EXEMPLARY EMBODIMENTS

Hereinafter, exemplary embodiments of the present invention will be described in detail with reference to the accompanying drawings.

Figure 1:
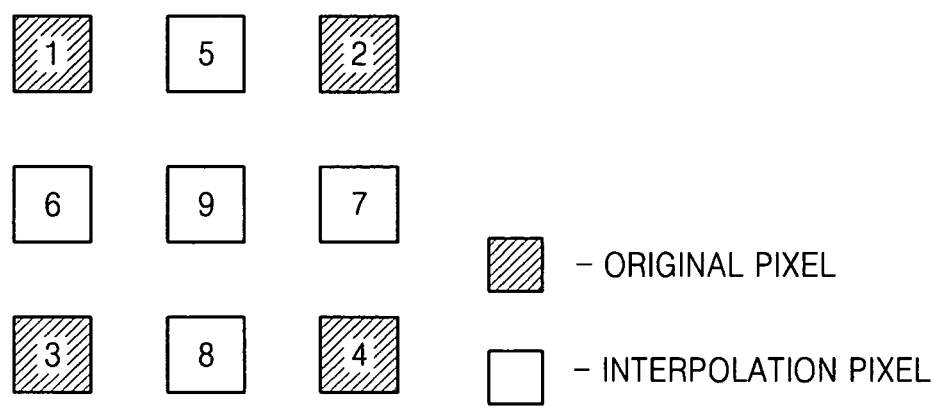
FIG. 1 is a reference diagram for explaining half-pixel interpolation.
Figure 2:
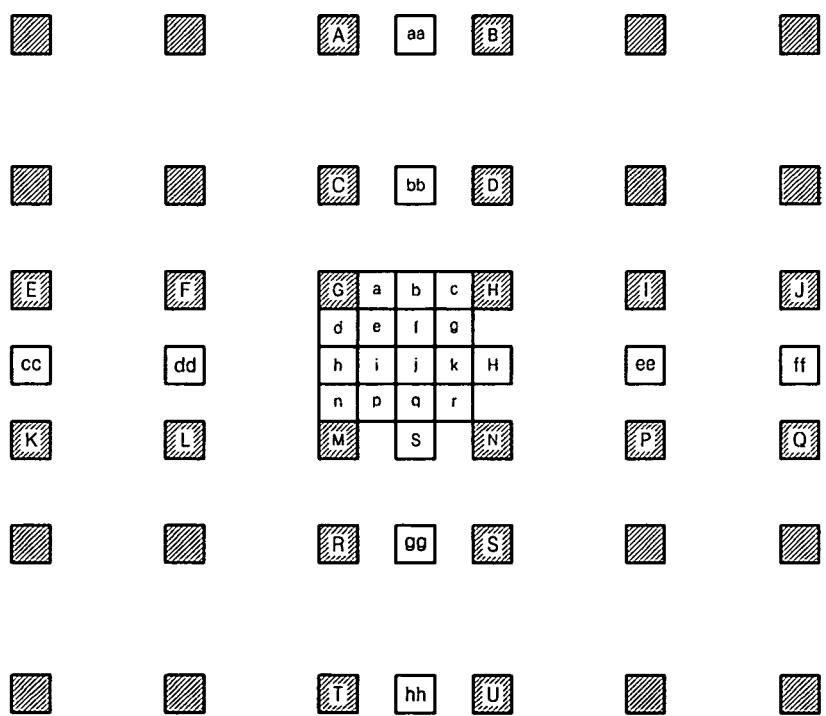
FIG. 2 is a reference diagram for explaining interpolation used for quarter pixel interpolation of luminance components in H.264.
Figure 3:
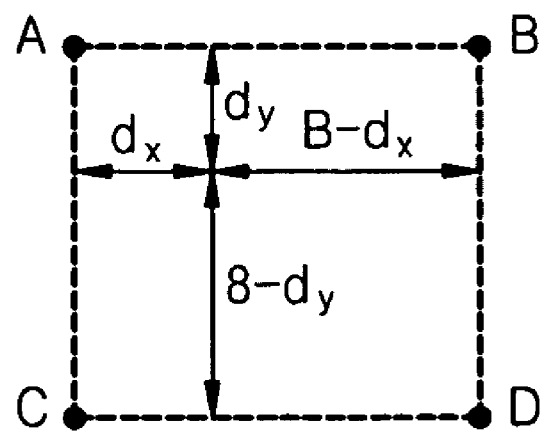
FIG. 3 is a view for explaining interpolation of chrominance components in H.264.
Figure 4:
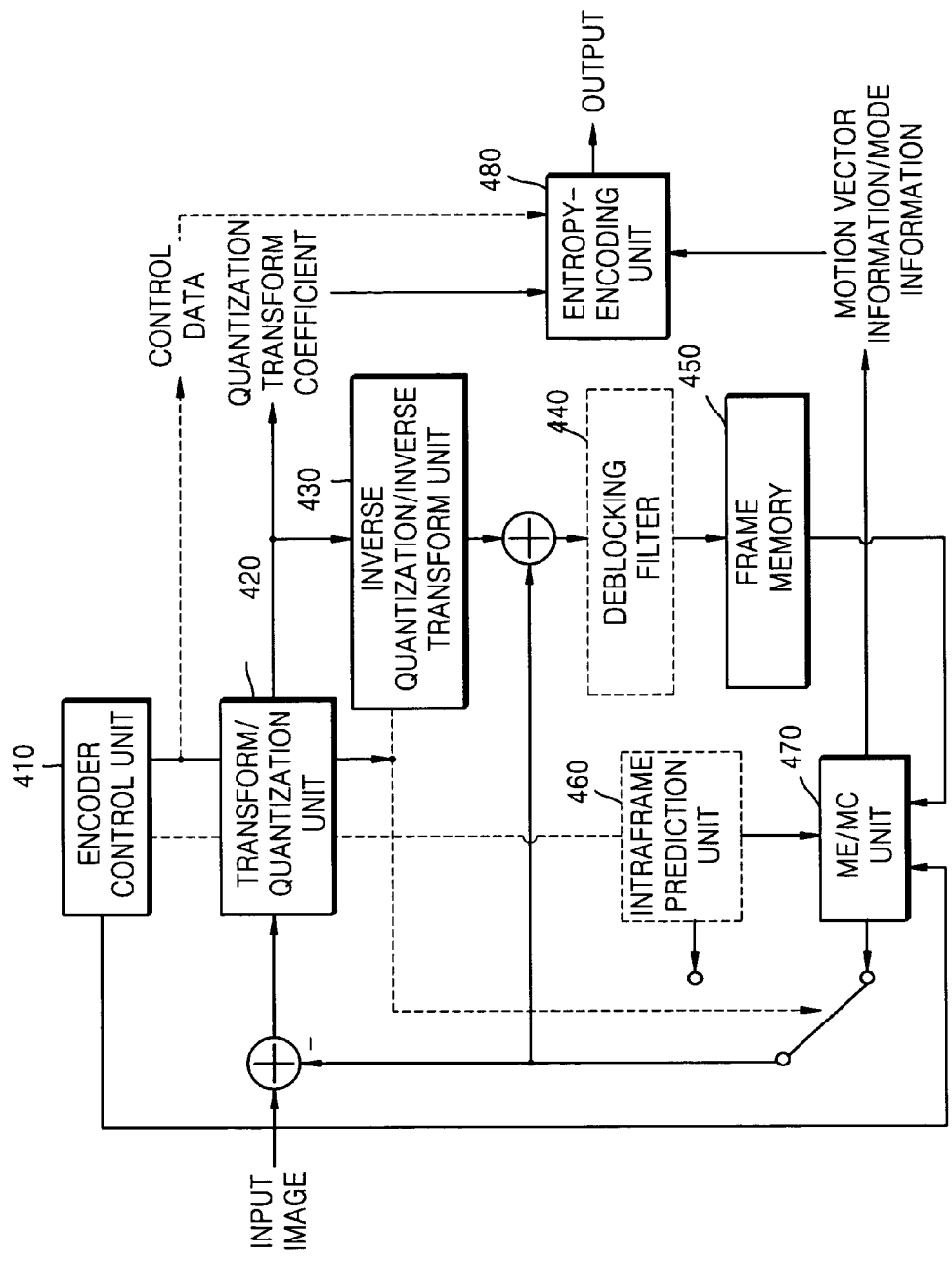
FIG. 4 is a block diagram of a video encoder using an interpolation method according to an exemplary embodiment of the present invention.

FIG. 4 is a block diagram of a video encoder using an interpolation method according to an exemplary embodiment of the present invention. The video encoder of FIG. 4 may be an MPEG-2, MPEG-4, or H.264 encoder.

First, input video data is divided into a plurality of 16×16 macroblocks.

An encoder control unit 410 serves as a bitrate controller to determine a quantization coefficient for each block so that a desired bitrate for the entire sequence and a target bit for each picture can be achieved.

A transform/quantization unit 420 transforms the input image data to remove spatial redundancy of the input image data. The transform/quantization unit 420 quantizes transform coefficients obtained by transform encoding using a predetermined quantization step, thereby obtaining two-dimensional N×M data composed of the quantized transform coefficients. A discrete cosine transform (DCT) or an integer transform may be used for the transform. The quantization is performed using a predetermined quantization step.

An inverse quantization/inverse transform unit 430 inversely quantizes the image data that is quantized by the transform/quantization unit 420 and inversely transforms the inversely quantized image data using, for example, an inverse DCT (IDCT).

A frame memory 450 stores the image data that is inversely quantized/inversely transformed by the inverse quantization/inverse transform unit 430 in frame units.

A motion estimation/motion compensation (ME/MC) unit 470 estimates a motion vector (MV) and a sum of absolute differences (SAD) for each macroblock using input image data of the current frame and image data of a previous frame stored in the frame memory 450.

An entropy-encoding unit 480 receives the quantized transform coefficients from the transform/quantization unit 420, motion vector information from the ME/MC unit 470, and information required for decoding such as coding type information and quantization step information from the encoder control unit 410, performs entropy-encoding, and outputs a final bitstream.

The video encoder of FIG. 4 may also further include a deblocking filter 440 and an intraframe prediction unit 460.

The deblocking filter 440 performs filtering to remove a blocking effect occurring in a motion-compensated image due to quantization and outputs the result of filtering to the frame memory 450.

The intraframe prediction unit 460 obtains a predictor for each block or macroblock in a spatial domain of an intra macroblock, obtains a difference between the obtained predictor and the intra macroblock, and transmits the difference to the transform/quantization unit 420.

The ME/MC unit 470 includes an interpolation unit (not shown) according to an exemplary embodiment of the present invention. The interpolation unit performs interpolation to improve the resolution of image required for the generation of a motion compensation value.

Hereinafter, an interpolation method (interpolation algorithm) implemented by the interpolation unit will be described with reference to FIGS. 5 through 10.

Figure 5:
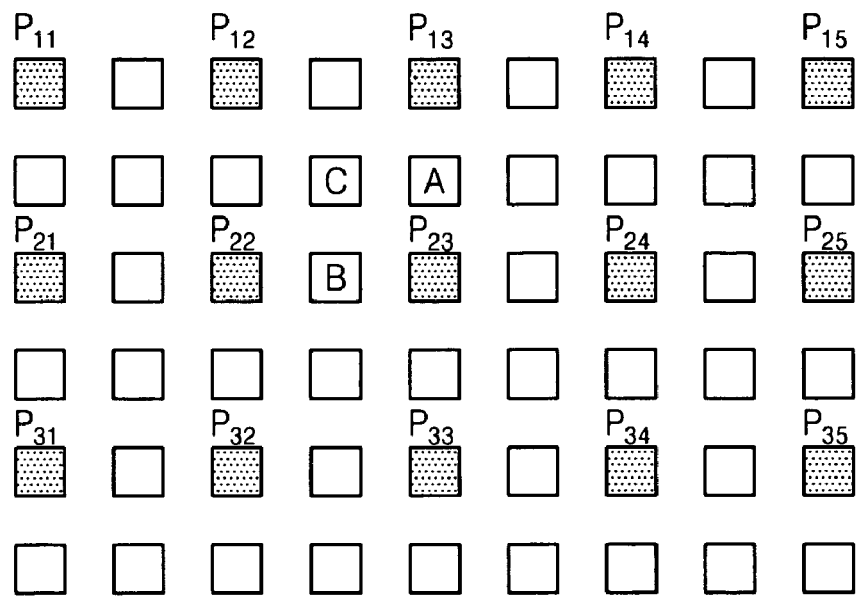
FIG. 5 is a view for explaining interpolation according to an exemplary embodiment of the present invention.

In FIG. 5, gray boxes indicate integer pixels and white boxes indicate interpolation pixels. In the current exemplary embodiment of the present invention, interpolation with respect to pixels A, B, and C will be described.

FIGS. 6A through 6E are views for explaining interpolation with respect to the pixel A among pixels illustrated in FIG. 5. In FIGS. 6A through 6E, directional interpolation values in 90°, 22.5°, 157.5°, 45°, and 135° directions are illustrated.

Figure 6A:
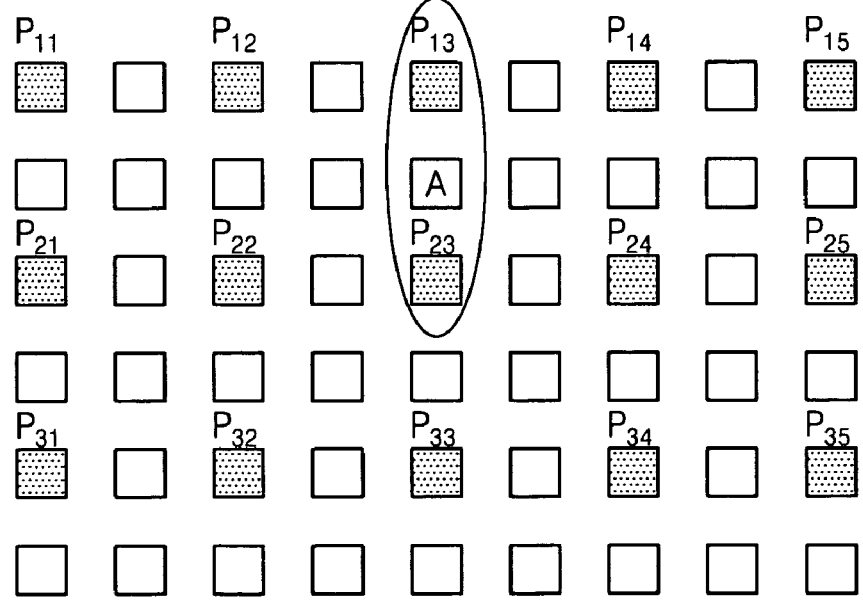

In FIG. 6A, a directional interpolation value A_int90 in the 90° direction with respect to the pixel A is generated by applying an average filter to integer pixels P13 and P23 that are adjacent to the pixel A as follows. In the current exemplary embodiment of the present invention, the integer pixels P13 and P23 are reconstructed integer pixels.

$$A\_int90=(P13+P23)/2 \quad (16)$$

Figure 6B:
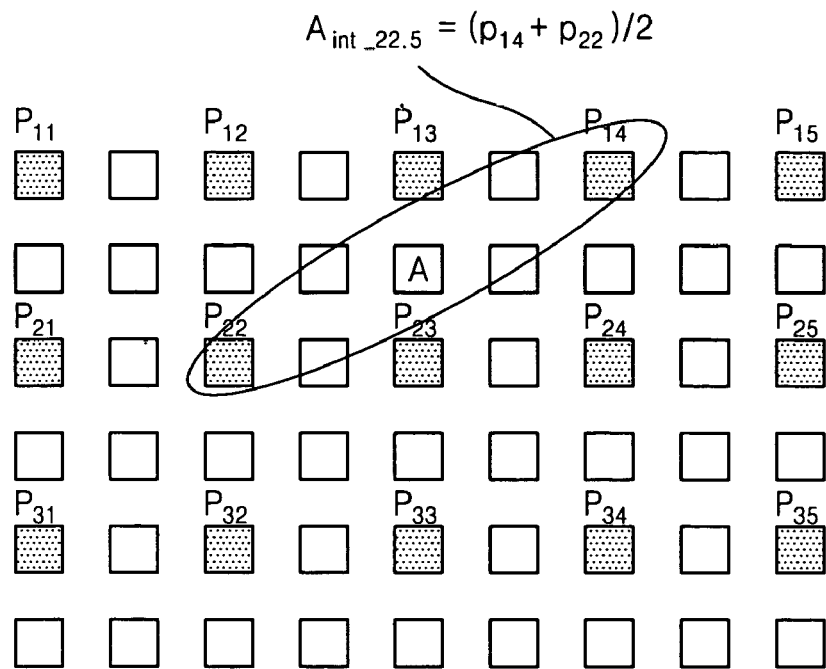

In FIG. 6B, a directional interpolation value A_int22.5 in the 22.5° direction with respect to the pixel A is generated by applying an average filter to integer pixels P14 and P22 that are adjacent to the pixel A as follows:

$$A\_int22.5=(P14+P22)/2 \quad (17)$$

Figure 6C:
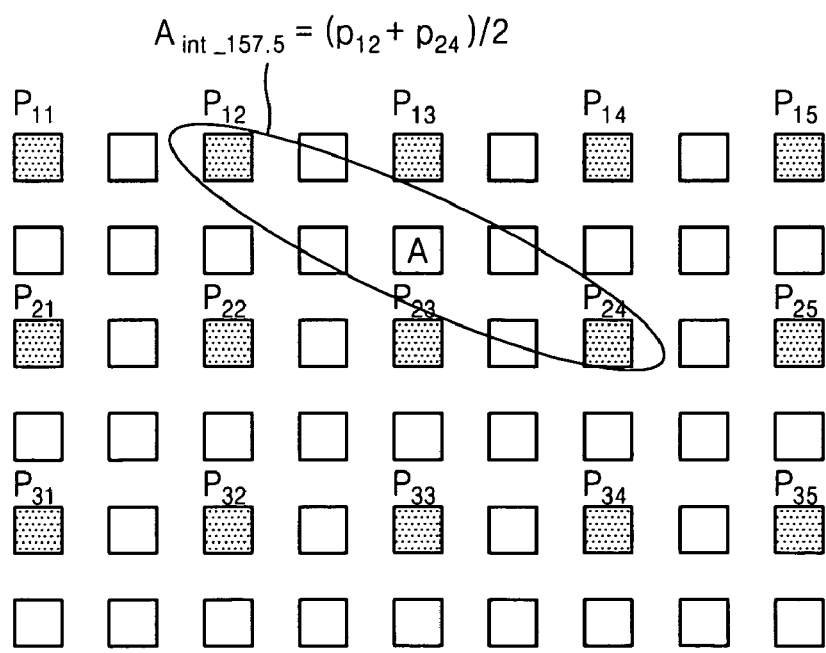

In FIG. 6C, a directional interpolation value A_int157.5 in the 157.5° direction with respect to the pixel A is generated by applying an average filter to integer pixels P12 and P24 that are adjacent to the pixel A as follows:

$$A\_int157.5=(P12+P24)/2 \quad (18)$$

Figures 6D, 6E:
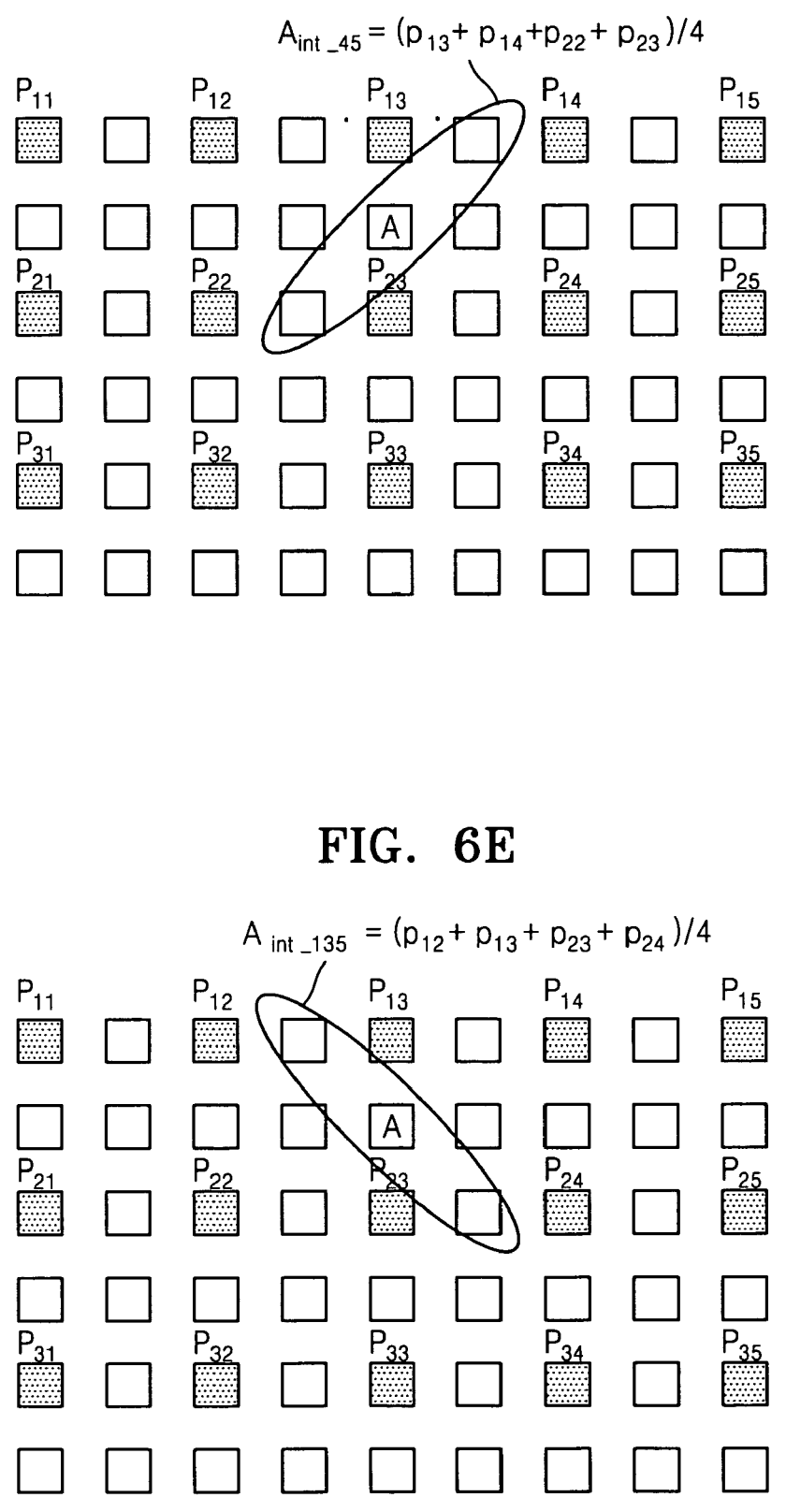

In FIG. 6D, a directional interpolation value A_int45 in the 45° direction with respect to the pixel A is generated by applying an average filter to integer pixels P13, P14, P22, and P23 that are adjacent to the pixel A as follows:

$$A\_int45=(P13+P14+P22+P23)/4 \quad (19)$$

In FIG. 6E, a directional interpolation value A_int135 in the 135° direction with respect to the pixel A is generated by applying an average filter to integer pixels P12, P13, P23, and P24 that are adjacent to the pixel A as follows:

$$A\_int135=(P12+P13+P23+P24)/4 \quad (20)$$

Directional interpolation may be performed in various other angle directions in addition to the 90°, 22.5°, 157.5°, 45°, and 135° directions used as examples in FIG. 6.

In the current exemplary embodiment of the present invention, one of a plurality of directions is selected for each pixel, directional interpolation according to the selected direction is performed on the pixel, and information about the selected direction is transmitted to a decoding unit.

The interpolation unit of the ME/MC unit 470 according to the current exemplary embodiment of the present invention selects one of a plurality of directions based on the characteristics of an image for each sub-block, performs directional interpolation on pixels of the sub-block according to the selected direction, generates mode information indicating a directional interpolation mode according to the selected direction, and transmits the generated mode information to the entropy-encoding unit 480.

Figure 7:
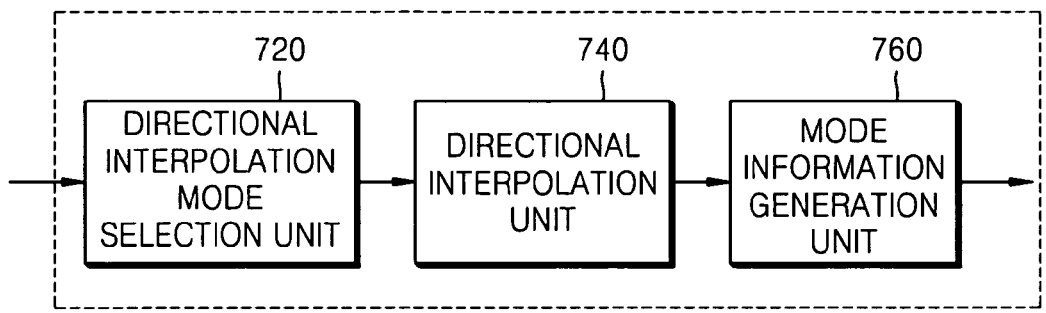
FIG. 7 is a detailed block diagram of an interpolation unit according to an exemplary embodiment of the present invention.

FIG. 7 is a detailed block diagram of the interpolation unit of the ME/MC unit 470.

A directional interpolation mode selection unit 720 selects a directional interpolation mode to be applied to a predetermined-size sub-block. The selection is made based on the characteristics of an image corresponding to the sub-block, e.g., edge information of the image. The edge information can be obtained by calculating a gradient for each direction and selecting a final direction using the calculated gradients.

For example, in FIG. 6, when a gradient for the 90° direction is D__90, D__90 is obtained using (|P12−P22|+|P13−P23|+|P14−P24|)/3. Similarly, a gradient D__22.5 for the 22.5° direction is obtained using (↑P13−P21|+|P14−P22|+|P15−P23|)/3. A gradient D__157.5 for the 157.5° direction is obtained using (|P11−P23|+|P12−P24|+|P13−P25|)/3. A gradient D__45 for the 45° direction is obtained using (|P13−P22|+|P14−P23|)/2. A gradient D__135 for the 135° direction is obtained using (↑P12−P23|+|P13−P24|)/2.

The directional interpolation mode selection unit 720 obtains a gradient for each of a plurality of directions for pixels of the sub-block and compares the gradients to select the final direction. For example, if the gradient for the 45° direction is smallest, the 45° direction is selected as an interpolation direction.

A directional interpolation unit 740 performs directional interpolation according to the 45° direction on the pixels of the sub-block.

A mode information generation unit 760 generates mode information indicating a directional interpolation mode according to the 45° direction and transmits the generated mode information to the entropy-encoding unit 480 of FIG. 4.

A sub-block used in the current exemplary embodiment of the present invention may be an 8×8 block, an 8×16 block, a 16×8 block, a 16×16 block, or a sub-block having various sizes and shapes. In particular, when input video data has a specific pattern, an optimal directional interpolation mode may be searched for each block having a shape corresponding to the pattern and directional interpolation may be performed according to the selected direction based on the result of the search.

According to another exemplary embodiment of the present invention, one of a plurality of directional interpolation modes is selected for each pixel according to a predetermined criterion and directional interpolation is performed according to the selected direction. For example, a gradient for each direction is calculated for each pixel and directional interpolation selected according to the results of calculation is performed.

For example, in FIG. 6, after the gradient D__90=(↑|P12−P22|+|P13−P23|+|P14−P24|)/3, the gradient D__22.5= (|P13−P21|+|P14−P22|+|P15−P23|)/3, the gradient D__157.5=(|P11−P23|+|P12−P24|+|P13−P25|)/3, the gradient D__45=(|P13−P22|+|P14−P23|)/2, and the gradient D__135=(|P12−P23|+|P13−P24|)/2 according to the plurality of directions are calculated, the direction having the smallest gradient is selected as the final direction. In the current exemplary embodiment of the present invention, since a directional interpolation mode is selected according to the same criterion in the video encoder and the video decoder, it is not necessary to transmit separate direction information to the decoding unit. Thus, in the current exemplary embodiment of the present invention, the mode information generation unit 760 of FIG. 7 is not required.

FIGS. 8A through 8E are views for explaining interpolation with respect to the pixel B among the pixels illustrated in FIG. 5. In FIGS. 8A through 8E, directional interpolation values in 0°, 112.5°, 67.5°, 135°, and 45° directions are illustrated.

Figure 8A:
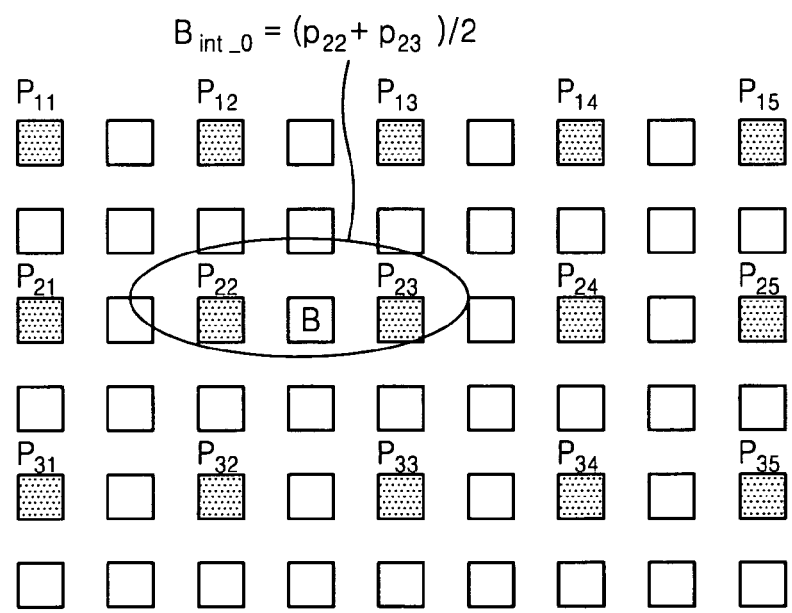
FIGS. 8A through 8E are views for explaining interpolation with respect to a pixel B among the pixels illustrated in FIG. 5 according to an exemplary embodiment of the present invention.

In FIG. 8A, a directional interpolation value B_int0 in the 0° direction with respect to the pixel B is generated using the average filter of integer pixels P22 and P23 that are adjacent to the pixel B as follows:

$$B\_int0=(P22+P23)/2 \qquad (21)$$

Figure 8B:
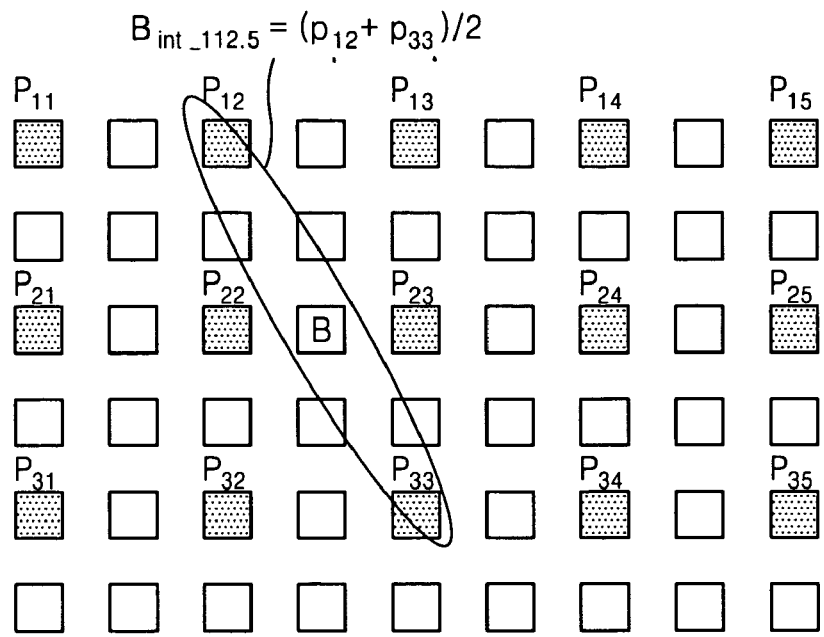

In FIG. 8B, a directional interpolation value B_int112.5 in the 112.5° direction with respect to the pixel B is generated using the average filter of integer pixels P12 and P33 that are adjacent to the pixel B as follows:

$$B\_int112.5=(P12+P33)/2 \qquad (22)$$

Figure 8C:
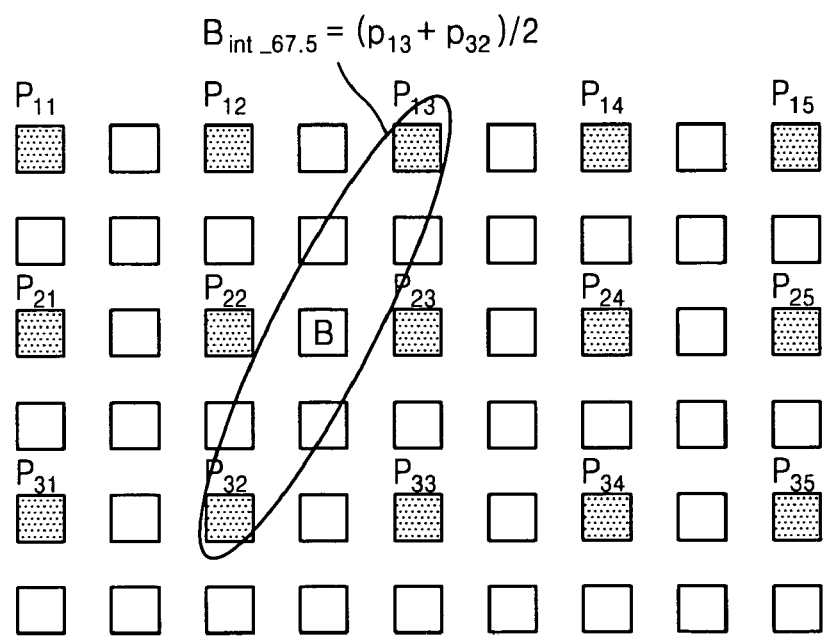

In FIG. 8C, a directional interpolation value B_int67.5 in the 67.5° direction with respect to the pixel B is generated using the average filter of integer pixels P13 and P32 that are adjacent to the pixel B as follows:

$$B\_int67.5=(P13+P32)/2 \qquad (23)$$

Figures 8D, 8E:
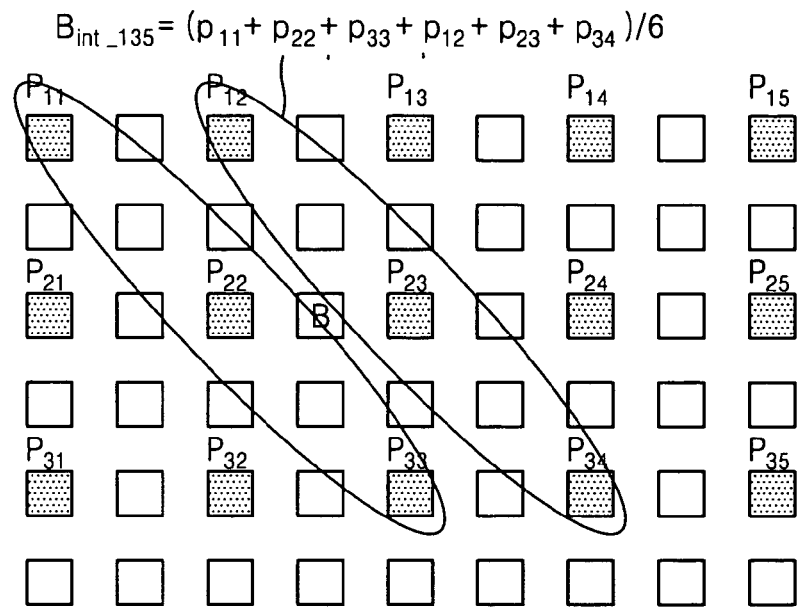

In FIG. 8D, a directional interpolation value B_int135 in the 135° direction with respect to the pixel B is generated using the average filter of integer pixels P11, P22, P33, P12, P23, and P34 that are adjacent to the pixel B as follows:

$$B\_int135=(P11+P22+P33+P12+P23+P34)/6 \qquad (24)$$

In FIG. 8E, a directional interpolation value B_int45 in the 45° direction with respect to the pixel B is generated using the average filter of integer pixels P13, P22, P31, P14, P23, and P32 that are adjacent to the pixel B as follows:

$$B\_int45=(P13+P22+P31+P14+P23+P32)/6 \qquad (25)$$

Directional interpolation may be performed in various-angle directions in addition to the 0°, 112.5°, 67.5°, 135°, and 45° directions taken as examples in FIG. 8.

When one of a plurality of directional interpolation modes is selected for each pixel, a gradient for each direction is calculated and a final direction is selected in the same manner as for the pixel A.

Figure 9A:
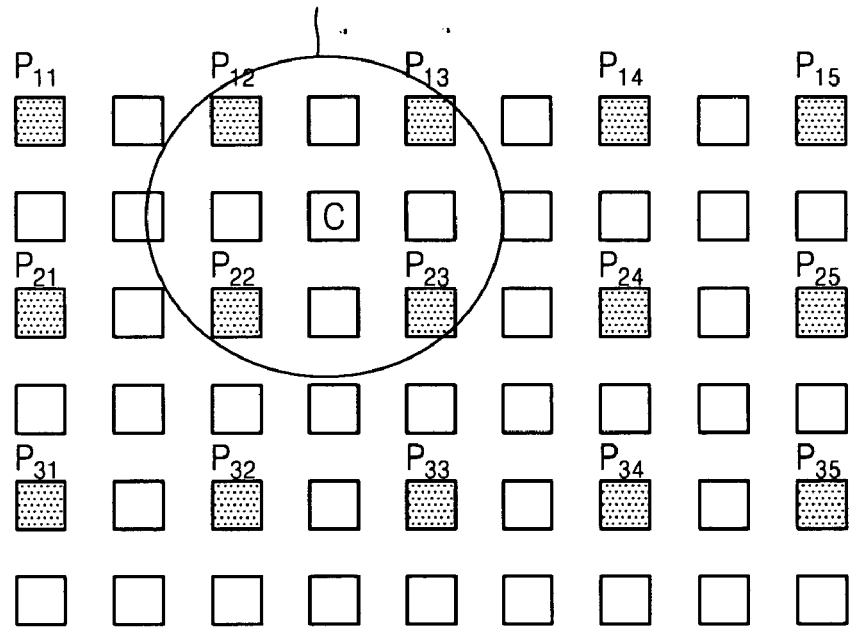
FIGS. 9A through 9C are views for explaining interpolation with respect to a pixel C among the pixels illustrated in FIG. 5 according to an exemplary embodiment of the present invention.
Figure 9B:
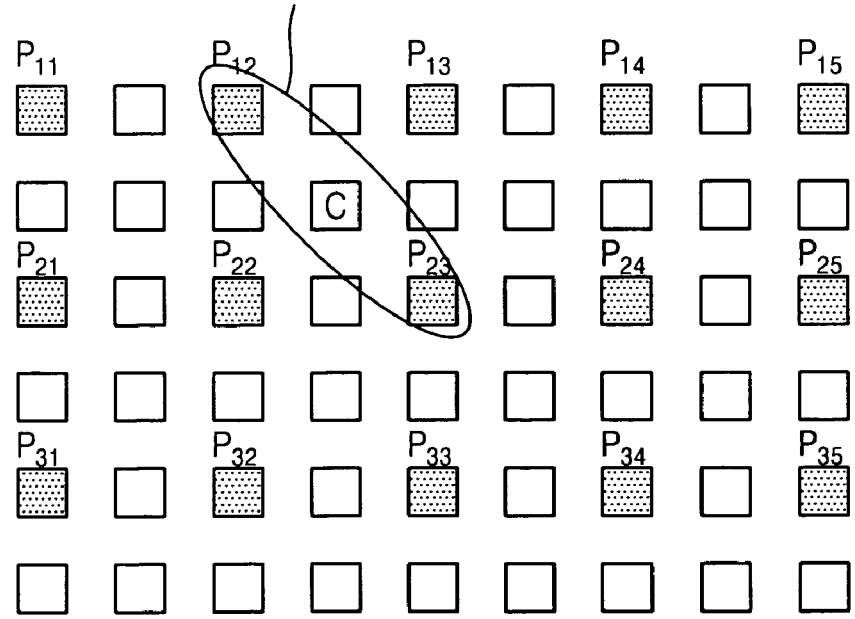
Figure 9C:
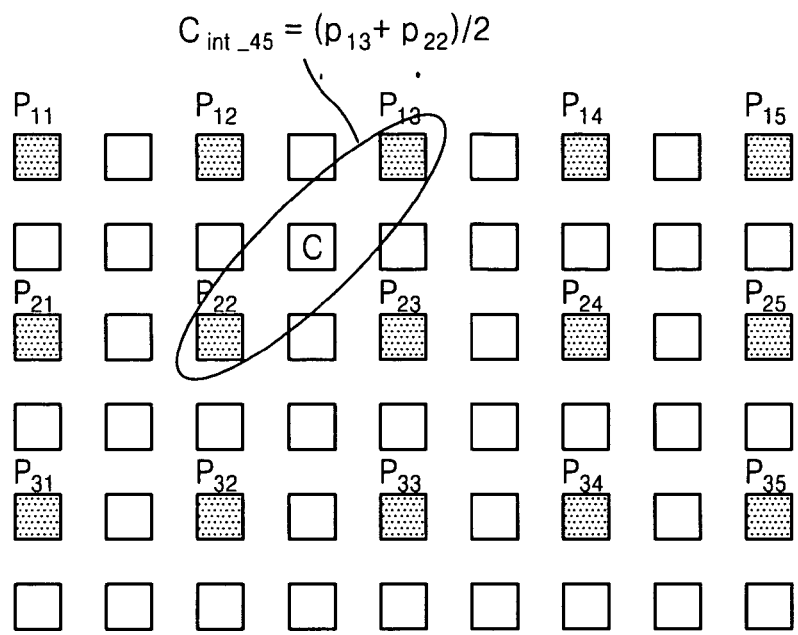

FIGS. 9A through 9C are views for explaining interpolation with respect to the pixel C among the pixels illustrated in FIG. 5. In FIGS. 9A through 9C, directional interpolation values in 0°, 135°, and 45° directions are illustrated.

In FIG. 9A, a directional interpolation value C_int0 in the 0° direction with respect to the pixel C is generated using the average filter of integer pixels P12, P13, P22, and P23 that are adjacent to the pixel C as follows:

$$C\_int0=(P12+P13+P22+P23)/4 \qquad (26)$$

In FIG. 9B, a directional interpolation value C_int135 in the 135° direction with respect to the pixel C is generated using the average filter of integer pixels P12 and P23 that are adjacent to the pixel C as follows:

$$C\_int135=(P12+P23)/2 \qquad (27)$$

In FIG. 9C, a directional interpolation value C_int45 in the 45° direction with respect to the pixel C is generated using the average filter of integer pixels P13 and P22 that are adjacent to the pixel B as follows:

$$C\_int45=(P13+P22)/2 \qquad (28)$$

The directional interpolation mode selection unit 720 of the interpolation unit may selectively use H.264 interpolation. In other words, an H.264 interpolation mode or one of a plurality of other directional interpolation modes may be used. For example, when gradients for a plurality of directions obtained for a predetermined sub-block exhibit uniform distribution, H.264 interpolation may be used, instead of selecting one of the plurality of directions.

Although only pixels that are adjacent to an interpolation pixel are used in the current exemplary embodiment of the present invention, pixels in a wider range may be used for H.264 interpolation.

In addition, while half-pixel motion compensation is considered in the current exemplary embodiment of the present invention, the present invention can also be applied to quarter-pixel motion compensation.

Figure 10:
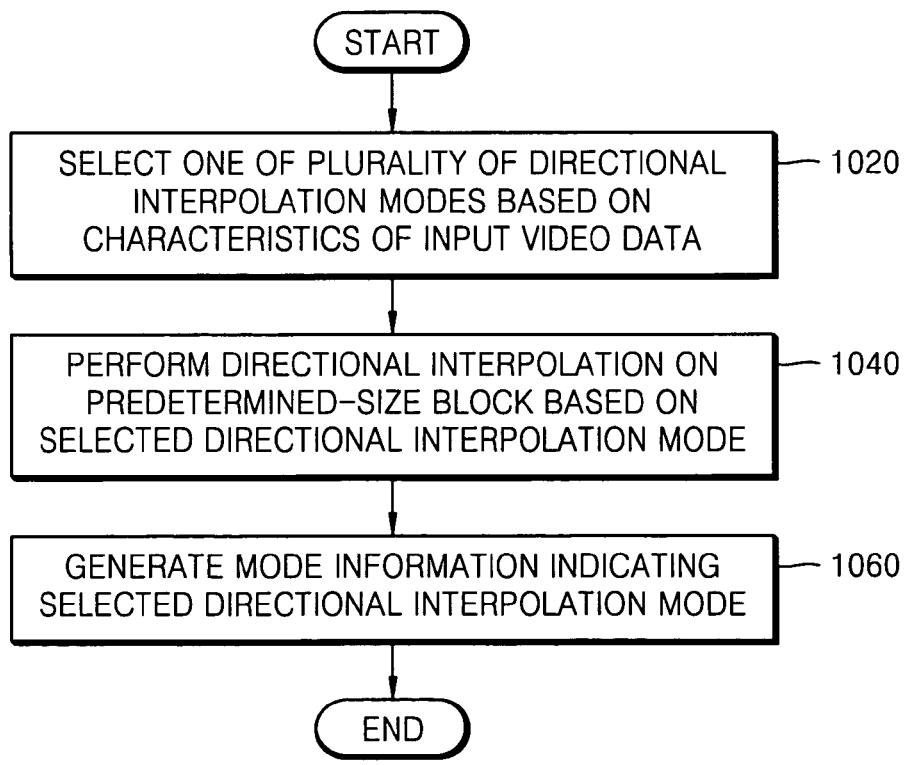
FIG. 10 is a flowchart illustrating an interpolation method implemented by an interpolation unit of the video encoder of FIG. 4 according to an exemplary embodiment of the present invention.

FIG. 10 is a flowchart illustrating an interpolation method implemented by the interpolation unit of the video encoder of FIG. 4.

In operation 1020, one of a plurality of directional interpolation modes is selected based on the characteristics of input image data. For example, a gradient for each of a plurality of directions is obtained for pixels of a predetermined-size block and the obtained gradients are compared to select an interpolation direction. For example, if the gradient for the 45° direction is smallest, the 45° direction is selected as the final direction.

In operation 1040, directional interpolation is performed on interpolation pixels of the block according to the direction selected in operation 1020, e.g., the 45° direction.

In operation 1060, mode information indicating the selected direction for the block is generated and is transmitted to the decoding unit.

Alternatively, in operation 1020, when the gradients for the directions obtained for the block exhibit uniform distribution, H.264 interpolation may be used, instead of selecting one of the plurality of directions. In this case, H.264 interpolation is performed in operation 1040 and mode information indicating H.264 interpolation is generated in operation 1060.

Alternatively, interpolation may be performed according to a direction selected for each of the pixels of the block based on a predetermined criterion. For example, a gradient for each of the directions is obtained for each of the pixels of the block and interpolation is performed according to a direction selected based on the calculated gradients. In this case, separate mode information is not generated.

Figure 11:
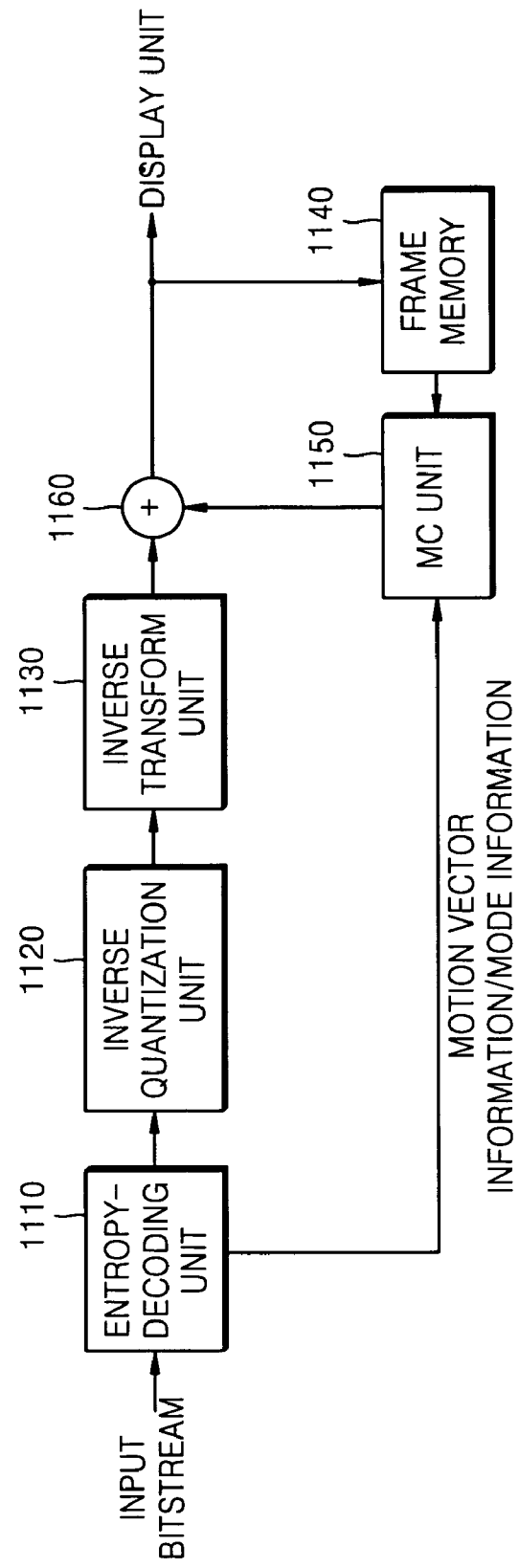
FIG. 11 is a block diagram of a video decoder using an interpolation method according to an exemplary embodiment of the present invention.

FIG. 11 is a block diagram of a video decoder using an interpolation method according to an exemplary embodiment of the present invention.

Referring to FIG. 11, the video decoder includes an entropy-decoding unit 1110, an inverse quantization unit 1120, an inverse transform unit 1130, a frame memory 1140, an MC unit 1150, and an addition unit 1160.

The entropy-decoding unit 1110 entropy-decodes an input encoded bitstream to extract image data, motion vector information, and mode information indicating an interpolation direction. The extracted image data is input to the inverse quantization unit 1120 and the extracted motion vector information and mode information are input to the MC unit 1150.

The inverse quantization unit 1120 inversely quantizes the input extracted video data.

The inverse transform unit 1130 inversely transforms the inversely quantized video data.

The MC unit 1150 performs motion compensation that is the same as that performed in a conventional video decoder. For interpolation pixels, the MC unit 1150 determines an interpolation direction for each predetermined-size block, e.g., each sub-block, using the input mode information and performs directional interpolation on interpolation pixels of the sub-block according to the determined interpolation direction.

The addition unit 1160 adds values output from the inverse transform unit 1130 and the MC unit 1150 and outputs the result of addition to a display unit (not shown) and the frame memory 1140.

According to another exemplary embodiment of the present invention, interpolation is performed using a method of determining an interpolation direction in the video encoder, instead of using separate mode information. In this case, since mode information indicating an interpolation direction is not inserted into an input bitstream, the extraction of the mode information by the entropy-decoding unit 110 and the output of the mode information to the MC unit 1150 are not required.

Figure 12:
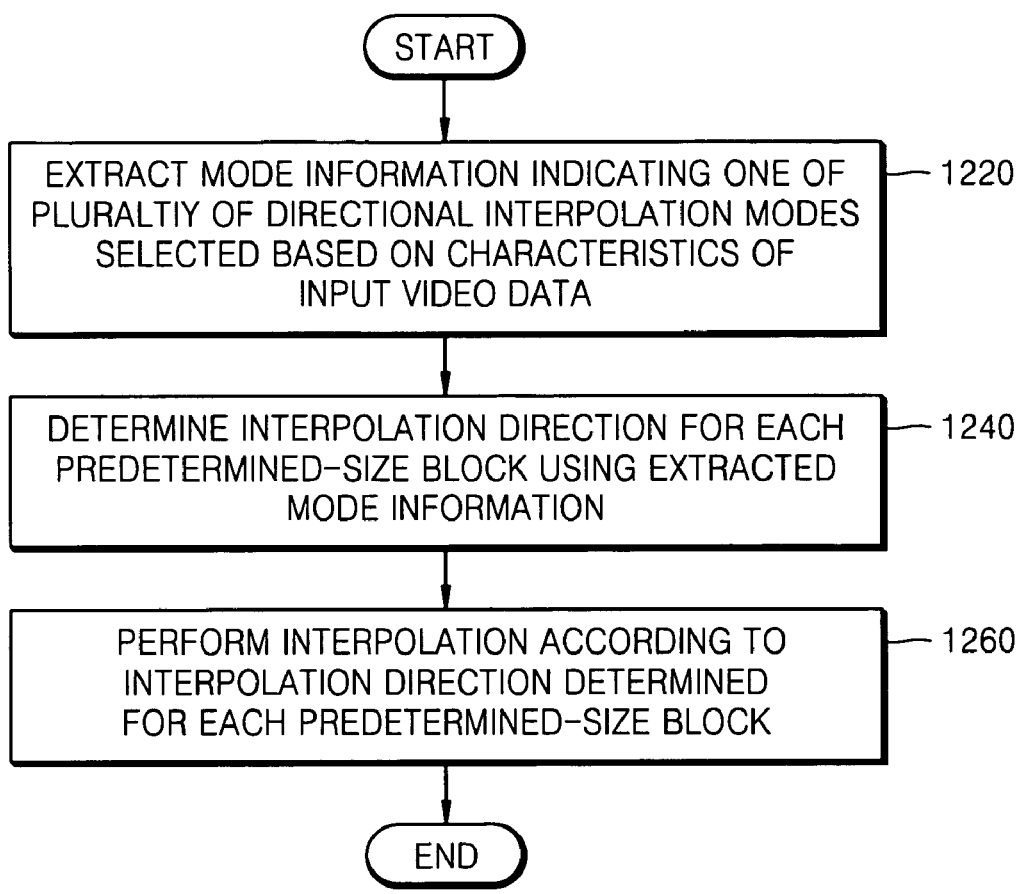
FIG. 12 is a flowchart illustrating an interpolation method implemented by an interpolation unit of the video decoder of FIG. 11 according to an exemplary embodiment of the present invention.

FIG. 12 is a flowchart illustrating an interpolation method implemented by the video decoder of FIG. 11.

In operation 1220, an input encoded bitstream is entropy-decoded to extract mode information indicating a directional interpolation mode. Here, the directional interpolation mode indicated by the mode information is selected based on the characteristics of input image data.

In operation 1240, an interpolation direction is determined for each predetermined-size block, e.g., each sub-block, using the extracted mode information.

In operation 1260, interpolation is performed on interpolation pixels of the predetermined-size block according to the determined interpolation direction.

According to another exemplary embodiment of the present invention, interpolation is performed using a method of determining an interpolation direction in the video encoder, instead of using separate mode information. For example, a gradient for each direction is calculated for each pixel and directional interpolation is performed according to an interpolation direction selected based on the calculated gradients. In this case, since mode information indicating an interpolation direction is not inserted into an input bitstream, the extraction of the mode information is not required.

As described above, according to the exemplary embodiments of the present invention, directional interpolation is performed adaptively according to the characteristics of input image data during motion compensation, thereby improving motion compensation efficiency and thus encoding efficiency.

Meanwhile, the exemplary embodiments of the present invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (e.g., transmission over the Internet). The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A directional interpolation method comprising:
selecting, under control of a computer, from a plurality of directional interpolation modes, one directional interpolation mode to be applied to a plurality of interpolation pixels included in a predetermined-size block based on characteristics of input video data;
performing directional interpolation on each of the interpolation pixels included in the predetermined-size block based on the selected directional interpolation mode; and
generating mode information indicating the selected directional interpolation mode.

2. The directional interpolation method of claim 1, wherein the characteristics of the input image data indicate edge information, and the selection of the directional interpolation mode further comprises calculating a gradient for each of a plurality of directions with respect to each of respective pixels included in the predetermined-size block.

3. The directional interpolation method of claim 2, wherein the selection of the directional interpolation mode is performed by selecting a direction having a smallest gradient and selecting a directional interpolation mode corresponding to the selected direction.

4. The directional interpolation method of claim 2, wherein the plurality of directions comprise at least one angle direction between horizontal and vertical directions.

5. The directional interpolation method of claim 4, wherein the respective pixels comprise at least one of a one-half pixel, a one-quarter pixel and a one-eighth pixel.

6. A directional interpolation method comprising:
selecting, under control of a computer, one of a plurality of directional interpolation modes for each pixel of a plurality of interpolation pixels based on characteristics of input video data; and
performing directional interpolation on the pixel based on the selected directional interpolation mode,
wherein the selection of the directional interpolation mode further comprises calculating a gradient for each of a plurality of directions for the pixel based on a sum of a plurality of abstract values of differences between pixels neighboring the pixel, and comparing the calculated gradients to select the one directional interpolation mode.

7. The directional interpolation method of claim 6, wherein the characteristics of the input image data indicate edge information.

8. The directional interpolation method of claim 7, wherein the selection of the directional interpolation mode is performed by selecting a direction having a smallest gradient and selecting a directional interpolation mode corresponding to the selected direction.

9. The directional interpolation method of claim 7, wherein the plurality of directions comprise at least one angle direction between horizontal and vertical directions.

10. The directional interpolation method of claim 9, wherein the respective pixels comprise at least one of a one-half pixel, a one-quarter pixel and a one-eighth pixel.

11. A directional interpolation method comprising:
extracting, under control of a computer, mode information from a received bitstream, the mode information indicating one directional interpolation mode that is selected among a plurality of directional interpolation modes based on characteristics of input video data and is to be applied to a plurality of interpolation pixels included in a predetermined-size block; and
performing directional interpolation on each of the interpolation pixels included in the predetermined-size block based on the extracted mode information.

12. The directional interpolation method of claim 11, wherein the characteristics of the input image data indicate edge information, and the selection of the directional interpolation mode is performed based on a gradient for each of a plurality of directions with respect to each of respective pixels included in the predetermined-size block.

13. A video encoding method using a directional interpolation method, the directional interpolation method comprising:
selecting, under control of a computer, from a plurality of directional interpolation modes, one directional interpolation mode to be applied to a plurality of interpolation pixels included in a predetermined-size block based on characteristics of input video data;
performing directional interpolation on each of the interpolation pixels included in the predetermined-size block based on the selected directional interpolation mode; and
generating mode information indicating the selected directional interpolation mode.

14. A video encoding method using a directional interpolation method, the directional interpolation method comprising:
selecting, under control of a computer, one of a plurality of directional interpolation modes for each pixel of a plurality of interpolation pixels based on characteristics of input video data; and
performing directional interpolation on the pixel based on the selected directional interpolation mode,
wherein the selection of the directional interpolation mode further comprises calculating a gradient for each of a plurality of directions for the pixel based on a sum of a plurality of abstract values of differences between pixels neighboring the pixel, and comparing the calculated gradients to select the one directional interpolation mode.

15. A video decoding method using a directional interpolation method, the directional interpolation method comprising:
extracting, under control of a computer, mode information from a received bitstream, the mode information indicating one directional interpolation mode that is selected among a plurality of directional interpolation modes based on characteristics of input video data and is to be applied to a plurality of interpolation pixels included in a predetermined-size block; and
performing directional interpolation on each of the interpolation pixels included in the predetermined-size block based on the extracted mode information.

16. A directional interpolation apparatus comprising:
a directional interpolation mode selection unit which selects, from a plurality of directional interpolation modes, one directional interpolation mode to be applied to a plurality of interpolation pixels included in a predetermined-size block based on characteristics of input video data;
a directional interpolation unit which performs directional interpolation on each of the interpolation pixels included in the predetermined-size block based on the selected directional interpolation mode; and
a mode information generation unit which generates mode information indicating the selected directional interpolation mode.

17. The directional interpolation apparatus of claim 16, wherein the characteristics of the input image data indicate edge information and the directional interpolation mode selection unit calculates a gradient for each of a plurality of directions with respect to each of respective pixels included in the predetermined-size block.

18. The directional interpolation apparatus of claim 17, wherein the directional interpolation mode selection unit selects a direction having a smallest gradient and selects a directional interpolation mode corresponding to the selected direction.

19. The directional interpolation apparatus of claim 17, wherein the plurality of directions comprise at least one angle direction between horizontal and vertical directions.

20. The directional interpolation apparatus of claim 19, wherein the respective pixels comprise at least one of a one-half pixel, a one-quarter pixel and a one-eighth pixel.

21. A directional interpolation apparatus comprising:
a directional interpolation mode selection unit which selects one of a plurality of directional interpolation modes for each of a plurality of pixels based on characteristics of input video data; and
a directional interpolation unit which performs directional interpolation on the pixels based on the selected directional interpolation mode,
wherein the directional interpolation mode selection unit calculates a gradient for each of a plurality of directions for the pixel based on a sum of a plurality of abstract values of differences between pixels neighboring the pixel, and compares the calculated gradients to select the one directional interpolation mode.

22. The directional interpolation apparatus of claim 21, wherein the characteristics of the input image data indicate edge information.

23. The directional interpolation apparatus of claim 22, wherein the directional interpolation mode selection unit selects a direction having a smallest gradient and selects a directional interpolation mode corresponding to the selected direction.

24. The directional interpolation method of claim 22, wherein the plurality of directions comprise at least one angle direction between horizontal and vertical directions.

25. The directional interpolation method of claim 24, wherein the respective pixels comprise at least one of a one-half pixel, a one-quarter pixel and a one-eighth pixel.

26. A directional interpolation apparatus comprising:
a mode information extraction unit which extracts mode information from a received bitstream, the mode information indicating a directional interpolation mode that is selected among a plurality of directional interpolation modes based on characteristics of input video data and is to be applied to a plurality of interpolation pixels included in a predetermined-size block; and
a directional interpolation unit which performs directional interpolation on each of the interpolation pixels included in the predetermined-size block based on the extracted mode information.

27. The directional interpolation apparatus of claim 26, wherein the characteristics of the input image data indicate edge information and the selection of the directional interpolation mode is performed based on a gradient for each of a plurality of directions with respect to each of respective pixels included in the predetermined-size block.

28. A video encoder comprising a directional interpolation apparatus, wherein the directional interpolation apparatus comprises:
   a directional interpolation mode selection unit which selects, from a plurality of directional interpolation modes, one directional interpolation mode to be applied to a plurality of interpolation pixels included in a predetermined-size block based on characteristics of input video data;
   a directional interpolation unit which performs directional interpolation on each of the interpolation pixels included in the predetermined-size block based on the selected directional interpolation mode; and
   a mode information generation unit which generates mode information indicating the selected directional interpolation mode.

29. A video encoder comprising a directional interpolation apparatus, wherein the directional interpolation apparatus comprises:
   a directional interpolation mode selection unit which selects one of a plurality of directional interpolation modes for each of a plurality of pixels based on characteristics of input video data; and
   a directional interpolation unit which performs directional interpolation on the pixels based on the selected directional interpolation mode,
   wherein the directional interpolation mode selection unit calculates a gradient for each of a plurality of directions for the pixel based on a sum of a plurality of abstract values of differences between pixels neighboring the pixel, and compares the calculated gradients to select the one directional interpolation mode.

30. A video decoder comprising a directional interpolation apparatus, wherein the directional interpolation apparatus comprises:
   a mode information extraction unit which extracts mode information from a received bitstream, the mode information indicating a directional interpolation mode that is selected among a plurality of directional interpolation modes based on characteristics of input video data and is to be applied to a plurality of interpolation pixels included in a predetermined-size block; and
   a directional interpolation unit which performs directional interpolation on each of the interpolation pixels included in the predetermined-size block based on the extracted mode information.

31. A computer-readable recording medium having recorded thereon a program for a directional interpolation method, the directional interpolation method comprising:
   selecting from a plurality of directional interpolation modes, one directional interpolation mode to be applied to a plurality of interpolation pixels included in a predetermined-size block based on characteristics of input video data;
   performing directional interpolation on each of the interpolation pixels included in the predetermined-size block based on the selected directional interpolation mode; and
   generating mode information indicating the selected directional interpolation mode.

32. A computer-readable recording medium having recorded thereon a program for a directional interpolation method, the directional interpolation method comprising:
   selecting one of a plurality of directional interpolation modes for each pixel of a plurality of interpolation pixels based on characteristics of input video data; and
   performing directional interpolation on the pixel based on the selected directional interpolation mode,
   wherein the selection of the directional interpolation mode further comprises calculating a gradient for each of a plurality of directions for the pixel based on a sum of a plurality of abstract values of differences between pixels neighboring the pixel, and comparing the calculated gradients to select the one directional interpolation mode.

33. A computer-readable recording medium having recorded thereon a program for a directional interpolation method, the directional interpolation method comprising:
   extracting mode information from a received bitstream, the mode information indicating one directional interpolation mode that is selected among a plurality of directional interpolation modes based on characteristics of input video data and is to be applied to a plurality of interpolation pixels included in a predetermined-size block; and
   performing directional interpolation on each of the interpolation pixels included in the predetermined-size block based on the extracted mode information.

34. A video decoding method using a directional interpolation method, the directional interpolation method comprising:
   selecting, under control of a computer, one of a plurality of directional interpolation modes for each pixel of a plurality of interpolation pixels included in a predetermined-size block based on characteristics of input video data; and
   performing directional interpolation on the pixel in the predetermined-size block based on the selected directional interpolation mode,
   wherein the selection of the directional interpolation mode further comprises calculating a gradient for each of a plurality of directions for the pixel based on a sum of a plurality of abstract values of differences between pixels neighboring the pixel, and comparing the calculated gradients to select the one directional interpolation mode.

* * * * *